United States Patent
Heo et al.

(10) Patent No.: US 9,798,697 B2
(45) Date of Patent: Oct. 24, 2017

(54) SENSOR NODE WITH PERIODIC INFORMATION GENERATION AND CONTROLLED INFORMATION TRANSMISSION

(71) Applicant: Electronics and Telecommunications Research Institute, Daejeon (KR)

(72) Inventors: Tae-Wook Heo, Daejeon (KR); Kwang Soo Kim, Daejeon (KR); Hyunhak Kim, Daejeon (KR); Jong-Arm Jun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1184 days.

(21) Appl. No.: 13/788,551

(22) Filed: Mar. 7, 2013

(65) Prior Publication Data

US 2013/0304423 A1    Nov. 14, 2013

(30) Foreign Application Priority Data

May 8, 2012  (KR) .................. 10-2012-0048592

(51) Int. Cl.
   *G06F 17/00* (2006.01)
   *G01D 21/00* (2006.01)
   *H04Q 9/00* (2006.01)

(52) U.S. Cl.
   CPC ............ *G06F 17/00* (2013.01); *G01D 21/00* (2013.01); *H04Q 9/00* (2013.01); *H04Q 2209/883* (2013.01)

(58) Field of Classification Search
   CPC ..... H04W 84/18; H04W 40/08; H04W 40/10; H04W 52/0235; H04W 52/0219; Y02B 60/50; H04L 67/12; H04Q 2209/883; H04Q 9/00
   See application file for complete search history.

(56) References Cited

U.S. PATENT DOCUMENTS

| 2008/0055069 A1* | 3/2008 | Aiki et al. .......... H04W 52/029 340/539.3 |
| 2010/0118786 A1* | 5/2010 | Ryu ....................... G01D 21/00 370/328 |

FOREIGN PATENT DOCUMENTS

| KR | 10-2009-0024858 A | 3/2009 |
| KR | 10-2010-0068073 A | 6/2010 |
| KR | 100964108 B1 | 6/2010 |

(Continued)

OTHER PUBLICATIONS

Kyoung-Jin Jo et al., "Development of Real Time Monitoring System based on Context-awareness for Wireless Sensor Networks", The Journal of the Korea Contents Association, vol. 11, No. 4, pp. 101-111, 2011. English abstract.

*Primary Examiner* — Manuel L Barbee
(74) *Attorney, Agent, or Firm* — Rabin & Berdo, P.C.

(57) ABSTRACT

A high energy efficiency sensor node and an operating method thereof are provided. The high energy efficiency sensor node may include a sensing unit to generate sensed information and to store the sensed information in a database when a set period commences, and a control unit to obtain n pieces of sensed information corresponding to n periods from the database, and to transmit the n pieces of sensed information obtained to a first neighbor node when the n periods elapse.

2 Claims, 6 Drawing Sheets

(56) References Cited

FOREIGN PATENT DOCUMENTS

| KR | 10-2011-0073902 A | 6/2011 |
|---|---|---|
| KR | 10-2011-0083083 A | 7/2011 |

\* cited by examiner

SENSOR NODE WITH PERIODIC INFORMATION GENERATION AND CONTROLLED INFORMATION TRANSMISSION

CROSS-REFERENCE TO RELATED APPLICATION

This application claims the benefit of Korean Patent Application No. 10-2012-0048592, filed on May 8, 2012, in the Korean Intellectual Property Office, the disclosure of which is incorporated herein by reference.

BACKGROUND

1. Field of the Invention

The present invention relates to a technology for increasing an energy efficiency at a sensor node by transmitting sensed information using various methods.

2. Description of the Related Art

Basic operations of a current sensor node are based on request/response data processing, and regular response data processing. That is, the sensor node may request sensed information from another sensor node connected to the sensor node. The sensor node may receive one-time sensed information from the other sensor node in response to the request, or may receive sensed information periodically. For example, the sensor node may request current temperature from the other node, and may receive a one-time temperature value or may receive a temperature value on a minute by minute basis.

In this instance, when the sensor node operates based on the one-time sensed information request and response, energy consumption with respect to the request and response may increase. In a case in which the sensor node operates based on the periodic response, an unnecessary amount of energy may be consumed when frequency of the response is extremely high.

Accordingly, there is a need for a technology for obtaining sensed information at a desired point in time while increasing an energy efficiency between sensor nodes using various methods.

SUMMARY

An aspect of the present invention provides a technology for increasing an energy efficiency at a sensor node, by transmitting sensed information using various methods, for example, a method of simultaneously transmitting a plurality of pieces of sensed information to that is respectively generated periodically, a method of transmitting sensed information when the sensed information fails to satisfy predetermined conditions, and a method of transmitting at least one of first sensed information that fails to satisfy predetermined conditions, second sensed information generated prior to the first sensed information, and neighbor information when sensed information fails to satisfy the predetermined conditions.

According to an aspect of the present invention, there is provided a sensor node including a sensing unit to generate sensed information and to store the sensed information in a database for each set period, and a control unit to obtain n pieces of sensed information corresponding to n periods from the database for each of the n periods, and to transmit the n pieces of sensed information obtained to a first neighbor node, wherein n denotes a natural number.

According to another aspect of the present invention, there is provided an operating method of a sensor node, the method including generating sensed information and storing the sensed information for each set period, and obtaining n pieces of sensed information corresponding to n periods from the database for each of the n periods, and transmitting the n pieces of sensed information obtained to a first neighbor node when the n periods elapse, wherein n denotes a natural number.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a high energy efficiency sensor node and an operating method thereof according to exemplary embodiments of the present invention will be described in detail with reference to the accompanying drawings.

Figure 1:
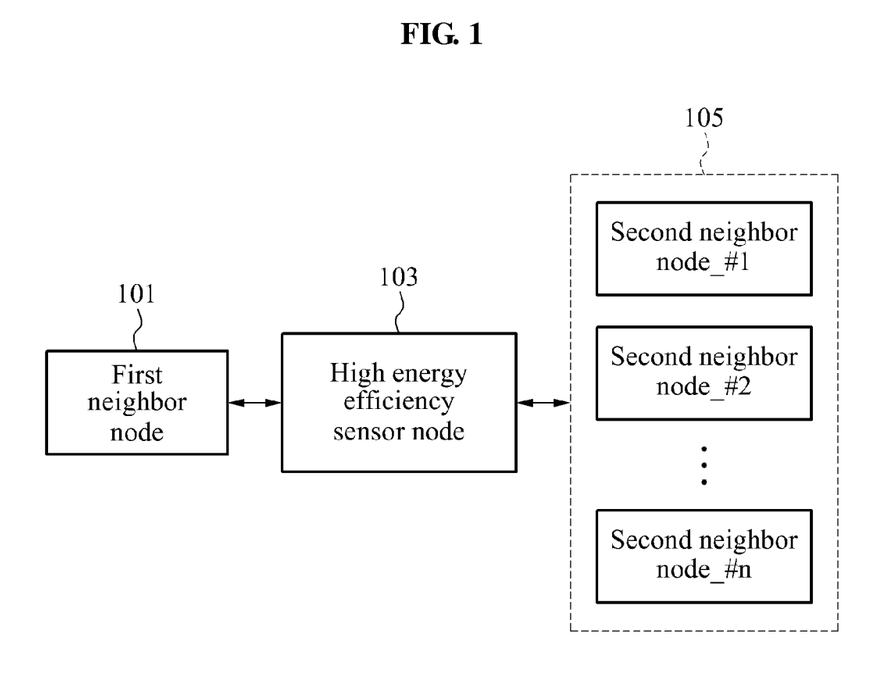
FIG. 1 is a block diagram illustrating a network including a high energy efficiency sensor node according to an embodiment of the present invention.

FIG. 1 is a block diagram illustrating a network including a high energy efficiency sensor node 103 according to an embodiment of the present invention.

Referring to FIG. 1, the network including the sensor node 103 may include a plurality of sensor nodes. Here, the plurality of sensor nodes may include, for example, a first neighbor node 101, the sensor node 103, and at least one second neighbor node 105.

The first neighbor node 101 may correspond to, for example, an actuator node, and may communicate with the sensor node 103. In this instance, the first neighbor node 101 may receive sensed information from the sensor node 103, and may verify surrounding information of the sensor node 103.

The sensor node 103 may generate sensed information by sensing surroundings periodically, and may transmit the sensed information to the first neighbor node 101, using various methods. For example, the sensor node 103 may transmit sensed information to the first neighbor node 101 every time sensed information is generated, may simultaneously transmit, to the first neighbor node 101, a plurality of pieces of sensed information that is respectively generated periodically, or may transmit sensed information to the first neighbor node 101 when the sensed information fails to satisfy predetermined conditions. In addition, when sensed information fails to satisfy predetermined conditions, the sensor node 103 may transmit, to the first neighbor node 101, at least one of first sensed information that fails to satisfy the predetermined conditions, second sensed information generated prior to the first sensed information, and neighbor information. Here, the neighbor information may refer to sensed information generated by the at least one second neighbor node 105, by sensing surroundings of the at least one second neighbor node 105.

When the sensor node 103 transmits sensed information to the first neighbor node 101, the sensor node 103 may transmit the sensed information in various forms. For example, the sensor node 103 may transmit n sensed values of actual size as n pieces of sensed information, or may transmit a minimum or maximum sensed value, among the n sensed values, and a difference value between sensed values. Here, n denotes a natural number.

The at least one second neighbor node 105 may correspond to a child node of the sensor node 103, and may communicate with the sensor node 103. That is, the at least one second neighbor node 105 may transmit, to the sensor node 103, neighbor information generated by sensing surroundings of the at least one second neighbor node 105, that is, sensed information generated by the at least one second neighbor node 105. In this instance, the at least one second neighbor node 105 may transmit the neighbor information to the sensor node 103, using various methods, for example, a method of transmitting the sensed information from the sensor node 103 to the first neighbor node 101.

Figure 2:
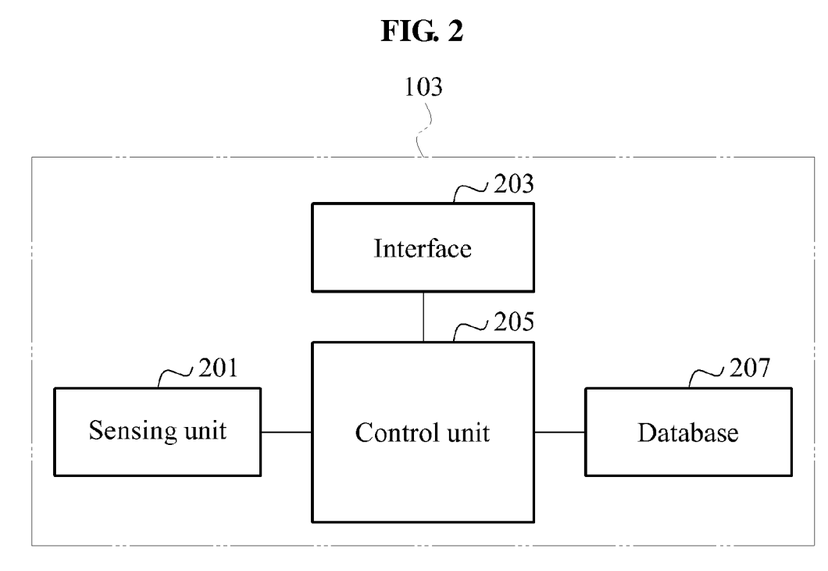
FIG. 2 is a block diagram illustrating a configuration of a high energy efficiency sensor node according to an embodiment of the present invention.

FIG. 2 is a block diagram illustrating a configuration of a high energy efficiency sensor node 103 according to an embodiment of the present invention.

Referring to FIG. 2, the sensor node 103 may include a sensing unit 201, an interface 203, a control unit 205, and a database 207.

The sensing unit 201 may generate sensed information by sensing surroundings, for example, temperature, and humidity, and may store the sensed information in the database 207. In this instance, the sensing unit 201 may sense the surroundings based on an interruption associated with the sensing, or may sense the surroundings when a set period commences, for example, based on a sensing instruction according to timer elapse. Here, the interruption may include, for example, a request for sensed information from a first neighbor node, and a sensing instruction according to an input of a setting key. That is, the sensing unit 201 may perform the sensing when the interruption associated with the sensing is received, or may perform the sensing for each set period.

The interface 203 may receive neighbor information from a second neighbor node, and may store the neighbor information in the database 207. Here, the neighbor information may refer to sensed information generated by the second neighbor node, by sensing surroundings of the second neighbor node. In this instance, the second neighbor node may correspond to a child node of the high energy efficiency sensor node 103.

The control unit 205 may transmit the sensed information generated by the sensing unit 201 to the first neighbor node, using various methods.

As an example, the control unit 205 may transmit sensed information to the first neighbor node periodically, every time the sensed information is generated. In this instance, a maximum delay time may correspond to a period. That is, the control unit 205 may transmit sensed information to the first neighbor node once the sensed information is generated by the sensing unit 201.

As another example, the control unit 205 may simultaneously transmit, to the first neighbor node, n pieces of sensed information accumulated in the database 207 during a set period of time. In this instance, the control unit 205 may obtain, from the database 207, n pieces of sensed information corresponding to n periods when the n periods elapse, and may transmit the n pieces of sensed information obtained to the first neighbor node. That is, the control unit 205 may obtain the n pieces of sensed information from the database 207 for each of the n periods, and may simultaneously transmit the n pieces of sensed information to the first neighbor node. In this instance, the maximum delay time may correspond to n×period. Here, n denotes a natural number.

As still another example, the control unit 205 may verify sensed information every time the sensed information is generated by the sensing unit 201, and may selectively transmit the sensed information to the first neighbor node. That is, the control unit 205 may transmit, to the first neighbor node, a portion of the sensed information generated, based on predetermined conditions.

In particular, when sensed information generated by the sensing unit 201 fails to satisfy predetermined conditions, the control unit 205 may transmit, to the first neighbor node, the sensed information that fails to satisfy the predetermined conditions. Conversely, when the sensed information satisfies the predetermined conditions, the control unit 205 may transmit, to the first neighbor node, the sensed information that satisfies the predetermined conditions. For example, when a sensed value generated by the sensing unit 201 is greater than or equal to a predetermined threshold value, the control unit 205 may transmit the sensed value to the first neighbor node. Conversely, when the sensed value is less than or equal to the predetermined threshold value, the control unit 205 may transmit the sensed value to the to first neighbor node.

As yet another example, the control unit 205 may verify first sensed information every time sensed information is generated by the sensing unit 201, and may selectively transmit the first sensed information to the first neighbor node. When the control unit 205 transmits the first sensed information, the control unit 205 may transmit the first sensed information, and second sensed information generated prior to the first sensed information. Here, the second information may refer to sensed information generated before the first sensed information is generated. That is, when first sensed information generated by the sensing unit 201 fails to satisfy predetermined conditions, the control unit 205 may transmit, to the first neighbor node, the first sensed information that fails to satisfy the predetermined conditions, and m pieces of second information generated prior to the first sensed information. Here, m denotes a natural number. For example, when a first sensed value, as the sensed information, generated by the sensing unit 201 is greater than or equal to a predetermined threshold value, or when the first sensed value is less than or equal to the predetermined threshold value, the control unit 205 may transmit, to the first neighbor node, the first sensed value, and four second sensed values that are sequentially generated prior to the first sensed value.

As further another example, the control unit 205 may verify first sensed information every time sensed information is generated by the sensing unit 201, and may selectively transmit the first sensed information to the first neighbor node. When the control unit 205 transmits the first sensed information, the control unit 205 may transmit, to the first neighbor node, the first sensed information, second sensed information generated prior to the first sensed information, and neighbor information received from a second neighbor node. Here, the second sensed information may refer to sensed information generated before the first sensed information is generated. That is, when first sensed information generated by the sensing unit 201 fails to satisfy predetermined conditions, the control unit 205 may transmit, to the first neighbor node, the first sensed information that fails to satisfy the predetermined conditions, m pieces of second sensed information generated prior to the first sensed information, and neighbor information received from the second neighbor node.

When the control unit 205 transmits the sensed information to the first neighbor node, the control unit 205 may transmit n sensed values of an actual size as the n pieces of sensed information, or may transmit a minimum or maximum sensed value, among the n sensed values, and a difference value between sensed values.

For example, the control unit 205 may transmit real number values of "20.0, 21.0, 22.0, 23.0, 24.0" as the n sensed values of an actual size with respect to temperature.

As another example, the control unit 205 may transmit resulting values obtained by multiplying the n sensed values by a scale vector. That is, the control unit 205 may transmit integer values of "200, 210, 220, 230, 240" obtained by multiplying the real number values of "20.0, 21.0, 22.0, 23.0, 24.0" by the scale vector, for example, "10." In this instance, the control unit 205 may transmit a minimum sensed value, a maximum sensed value, and difference values between sensed values, that is, integer values of "200, 240, 0, 10, 20, 30, 40," thereby transferring the integer values of "200, 210, 220, 230, 240."

In this instance, when the control unit 205 transmits the integer values of "200, 210, 220, 230, 240," 1 byte may be assigned to each integer value and thus, a total of 5 bytes may be required. However, when the control unit 205 transmits the integer values of "200, 240, 0, 10, 20, 30, 40," the integer values of "200, 240, 0, 10, 20, 30, 40" may correspond to "200, 240, (40×5=200=1 byte)" and thus, a total of 3 bytes may be required. Accordingly, the control unit 205 may transmit the sensed values, using a relatively lower amount of data.

In addition, the control unit 205 may transmit a minimum sensed value, a maximum sensed value, a variance sensed value, and an average sensed value, with respect to the n sensed values.

Further, when the n sensed values are greater than or equal to a predetermined number, the control unit 205 may transmit the n sensed values by assuming the n sensed values to be n×n images. In this instance, the control unit 205 may compress and transmit the images with respect to the n sensed values, using an image compressing method, for example, lossless coding.

When the control unit 205 transmits sensed information and neighbor information simultaneously, the control unit 205 may transmit the neighbor information like an image vector. For example, the control unit 205 may transmit sensed information of "200, 210, 220, 230, 240," and neighbor information of "202, 205, 210, 213, 215" and "220, 222, 225, 228, 230" like images. In this instance, the control unit 205 may compress and transmit images with respect to the sensed information and the neighbor information, using an image compressing method, for example, run length coding.

The control unit 205 may control an operating mode of the sensor node 103. The operating mode may include, for example, a sleep mode for reducing power consumption by activating at least some essential functions, and a normal mode for activating all functions. The control unit 205 may switch from the sleep mode to the normal mode, that is, may wake up, to establish an environment in which the sensing unit 201 may perform sensing when a set period commences, and when an interruption associated with the sensing occurs while the sensor node 103 operates in the the sleep mode.

The database 207 may store the sensed information generated by the sensing unit 201. In addition, the database 207 may additionally store the neighbor information received from the second neighbor node.

Figure 3:
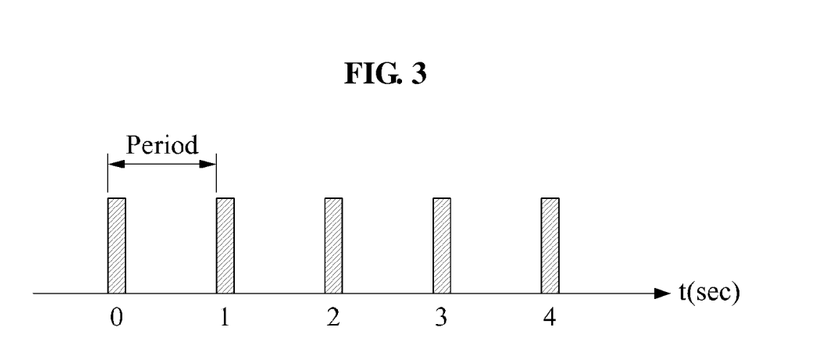
FIG. 3 is a diagram illustrating an example of transmitting sensed information at a high energy efficiency sensor node according to an embodiment of the present invention.

FIG. 3 is a diagram illustrating an example of transmitting sensed information at a high energy efficiency sensor node according to an embodiment of the present invention.

Referring to FIG. 3, the sensor node may generate sensed information when a set period commences, and may transmit the sensed information to a first neighbor node periodically every time the sensed information is generated. For example, the sensor node may generate sensed information, for example, every single second, and may transmit the sensed information to the first neighbor node. In particular, the sensor node may generate sensed information at a point in time corresponding to 0 seconds, that is, a point in time at which the sensing is started, and may transmit the sensed information generated to the first neighbor node. The sensor node may generate sensed information at a point in time corresponding to 1 second, and may transmit the sensed information generated to the first neighbor node. The sensor node may generate sensed information at points in time corresponding to 2 seconds, 3 seconds, 4 seconds, respectively, and may transmit the sensed information generated to the first neighbor node.

Figure 4:
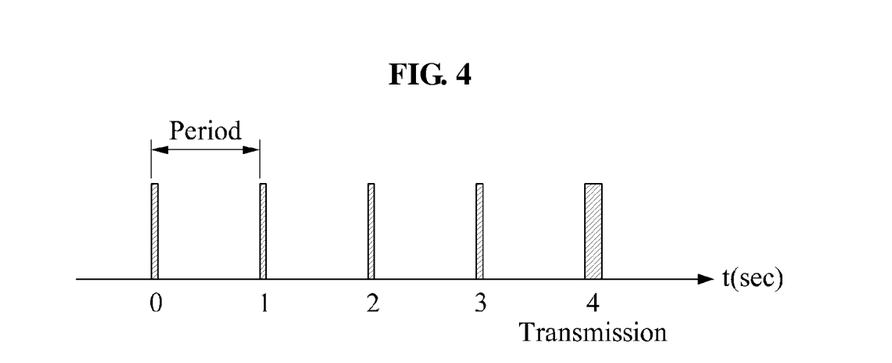
FIG. 4 is a diagram illustrating an example of transmitting sensed information at a high energy efficiency sensor node according to another embodiment of the present invention.

FIG. 4 is a diagram illustrating an example of transmitting sensed information at a high energy efficiency sensor node according to another embodiment of the present invention.

Referring to FIG. 4, the sensor node may generate sensed information when a set period commences, and may simultaneously transmit n pieces of sensed information to a first neighbor node. Here, n denotes a natural number. For example, the sensor node may generate sensed information, for example, on a second by second basis, and may transmit, to the first neighbor node, four pieces of sensed information generated during a set period of time, for each of the set period of time, for example, every 4 seconds. In particular, the sensor node may transmit, to the first neighbor node, four pieces of sensed information generated during a period of time from 1 to 4 seconds, at a point in time corresponding to 4 seconds, and may transmit, to the first neighbor node, four pieces of second information generated during a period of time from 5 to 8 seconds, at a point in time corresponding to 8 seconds.

Figure 5:
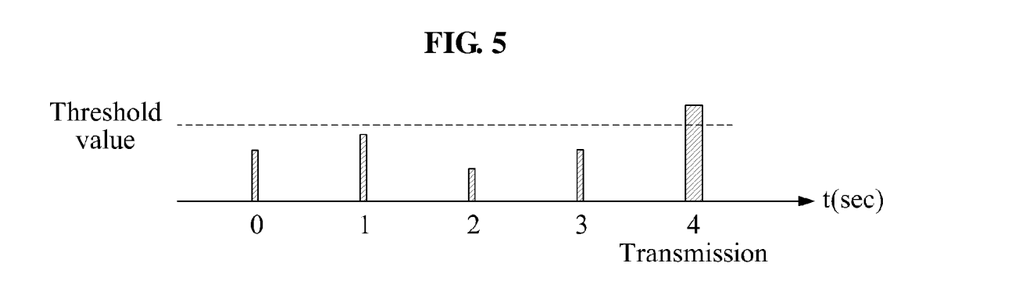
FIG. 5 is a diagram illustrating an example of transmitting sensed information at a high energy efficiency sensor node according to still another embodiment of the present invention.

FIG. 5 is a diagram illustrating an example of transmitting sensed information at a high energy efficiency sensor node according to still another embodiment of the present invention.

Referring to FIG. 5, the sensor node may generate sensed information when a set period commences, and may verify whether the sensed information generated satisfies predetermined conditions every time the sensed information is generated. Here, when the sensed information fails to satisfy the predetermined conditions, the sensor node may transmit the sensed information to a first neighbor node, thereby providing surrounding information of the sensor node to the first neighbor sensor. However, in this instance, a number of times sensed information is transmitted to the first neighbor node may be reduced, whereby an energy efficiency may increase.

For example, the sensor node may generate sensed information every single second, and may verify whether the sensed information generated satisfies predetermined conditions. In this instance, because each piece of sensed information generated during a period of time from 0 to 3 seconds satisfies the predetermined conditions, that is, each sensed value is less than a predetermined threshold value, the sensor node may not transmit the sensed information to the first neighbor node. Conversely, because sensed information generated at a point in time corresponding to 4 seconds fails to satisfy the predetermined conditions, that is, a sensed value is greater than or equal to the predetermined threshold value, the sensor node may transmit the sensed information to the first neighbor node.

In addition, when the sensor node transmits sensed information to the first neighbor node, the sensor node may transmit the sensed information, and m pieces of sensed information generated prior to the sensed information, thereby reducing a number of times sensed information is transmitted to the first neighboring node. Accordingly, an energy efficiency may increase, and a change in recently sensed information may be readily verified by the first neighboring node.

For example, when the sensor node transmits the sensed information that is generated at the point in time corresponding to 4 seconds and that fails to satisfy the predetermined conditions, the sensor node may simultaneously transmit, to the first neighbor node, the sensed information, and four pieces of sensed information generated during a period of time from 0 to 3 seconds.

In addition, when the sensor node transmits sensed information to the first neighbor node, the sensor node may transmit the sensed information, m pieces of sensed information generated prior to the sensed information, and neighbor information received from a second neighbor node. Here, the neighbor information may refer to sensed information generated by the second neighbor node. In this instance, the first neighbor node may verify surrounding information of the sensor node, and surrounding information of the second neighbor node positioned within a predetermined distance from the sensor node.

Figure 6:
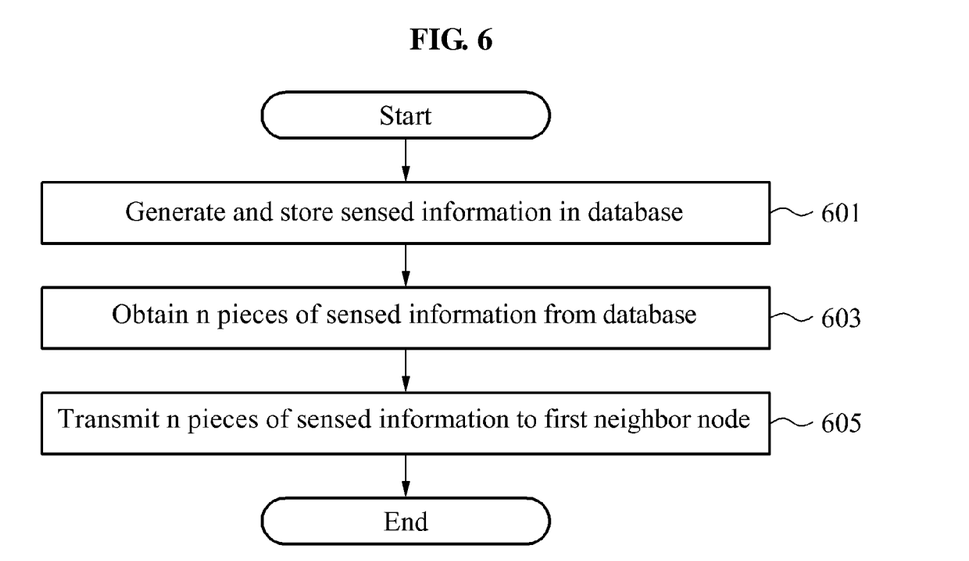
FIG. 6 is a flowchart illustrating an operating method of a high energy efficiency sensor node according to an embodiment of the present invention.

FIG. 6 is a flowchart illustrating an operating method of a high energy efficiency sensor node according to an embodiment of the present invention.

Referring to FIG. 6, in operation 601, the sensor node may generate sensed information by sensing surroundings, for example, temperature and humidity, and may store the sensed information in a database when a set period commences.

In this instance, the sensor node may sense the surroundings based on an interruption associated with the sensing, or may sense the surroundings when the set period commences, for example, based on a sensing instruction according to a timer elapsing. Here, the interruption may include, for example, a request for sensed information from a first neighbor node, and a sensing instruction according to an input of a setting key. That is, the sensor node may perform the sensing when the interruption associated with the sensing is received, or may perform the sensing for each set period.

In operation 603, the sensor node may obtain, from the database, n pieces of sensed information corresponding to n periods when the n periods elapse. That is, the sensor node may obtain the n pieces of sensed information from the database for each of the n periods.

In operation 605, the sensor node may transmit the n pieces of sensed information obtained from the database to the first neighbor node. In this instance, when the sensor node transmits sensed information to the first neighbor node, the sensor node may transmit n sensed values of actual size as the n pieces of sensed information, or may transmit a minimum or maximum sensed value among the n sensed values, and a difference value between sensed values.

As an example, the sensor node may transmit, to the first neighbor node, sensed information generated when the set period commences. Here, the sensor node may transmit the sensed information to the first neighbor node periodically, every time the sensed information is generated. That is, the sensor node may transmit the sensed information to the first neighbor node once the sensed information is generated.

As another example, when sensed information fails to satisfy predetermined conditions, the sensor node may transmit the sensed information that fails to satisfy the predetermined conditions to the first neighbor node. That is, the sensor node may transmit a portion of the sensed information to the first neighbor node, based on the predetermined conditions.

For example, when a sensed value generated as the sensed information is greater than or equal to a predetermined threshold value or when the sensed value is less than or equal to the predetermined threshold value, the sensor node may transmit the sensed value to the first neighbor node.

As still another example, when first sensed information fails to satisfy predetermined conditions, the sensor node may transmit, to the first neighbor node, the first sensed information that fails to satisfy the predetermined conditions, and m pieces of second sensed information generated prior to the first sensed information. Here, the second sensed information may refer to sensed information generated before the first sensed information is generated.

As yet another example, when first sensed information fails to satisfy predetermined conditions, the sensor node may transmit, to the first neighbor node, the first sensed information that fails to satisfy the predetermined conditions, m pieces of second sensed to information generated prior to the first sensed information, and neighboring information received from a second neighbor node. Here, the second sensed information may refer to sensed information generated before the first sensed information is generated. In this instance, the sensor node may receive the neighbor information from a child node of the sensor node as the second neighbor node, and may transmit the first sensed information, the m pieces of second sensed information, and the neighbor information to the first neighbor node.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

According to exemplary embodiments of the present invention, an energy efficiency at a sensor node may increase by transmitting sensed information using various methods, for example, a method of simultaneously transmitting a plurality of pieces of sensed information that is respectively generated periodically, a method of transmitting sensed information when the sensed information fails to satisfy predetermined conditions, and a method of transmitting at least one of first sensed information that fails to satisfy predetermined conditions, second to sensed information generated prior to the first sensed information, and neighbor information when sensed information fails to satisfy the predetermined conditions.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A sensor node having a first sensor node and a second sensor node neighboring thereto, comprising:
    a sensing unit configured to periodically generate first sensed information, one piece at a time, by sensing surroundings of the sensing node;
    an interface configured to receive a piece of second sensed information from the second sensor node; and
    a control unit configured to, responsive to the generation of each piece of first sensed information by the sensing unit,
        determine whether said each piece of first sensed information has a value that is larger than a predetermined threshold, and
        upon detecting that the value of said each piece of first sensed information is no larger than the predetermined threshold, transmit, to the first sensor node, said each piece of first sensed information, the received piece of second sensed information, and a predetermined number of pieces of first sensed information that the sensing unit generates prior to the generation of said each piece of first sensed information.

2. An operating method of a sensor node having a first sensor node and a second sensor node neighboring thereto, comprising:
    periodically generating sensed information, one piece at a time, by sensing surroundings of the sensor node;
    receiving a piece of second sensed information from the second sensor node; and
    responsive to the generation of each piece of first sensed information,
        determining whether said each piece of first sensed information has a value that is larger than a predetermined threshold, and
        upon detecting that the value of said each piece of first sensed information is no larger than the predetermined threshold, transmitting, to the first sensor node, said each piece of first sensed information, the received piece of second sensed information, and a predetermined number of pieces of first sensed information that have been generated before the generation of said each piece of first sensed information.

* * * * *